Figure 1:
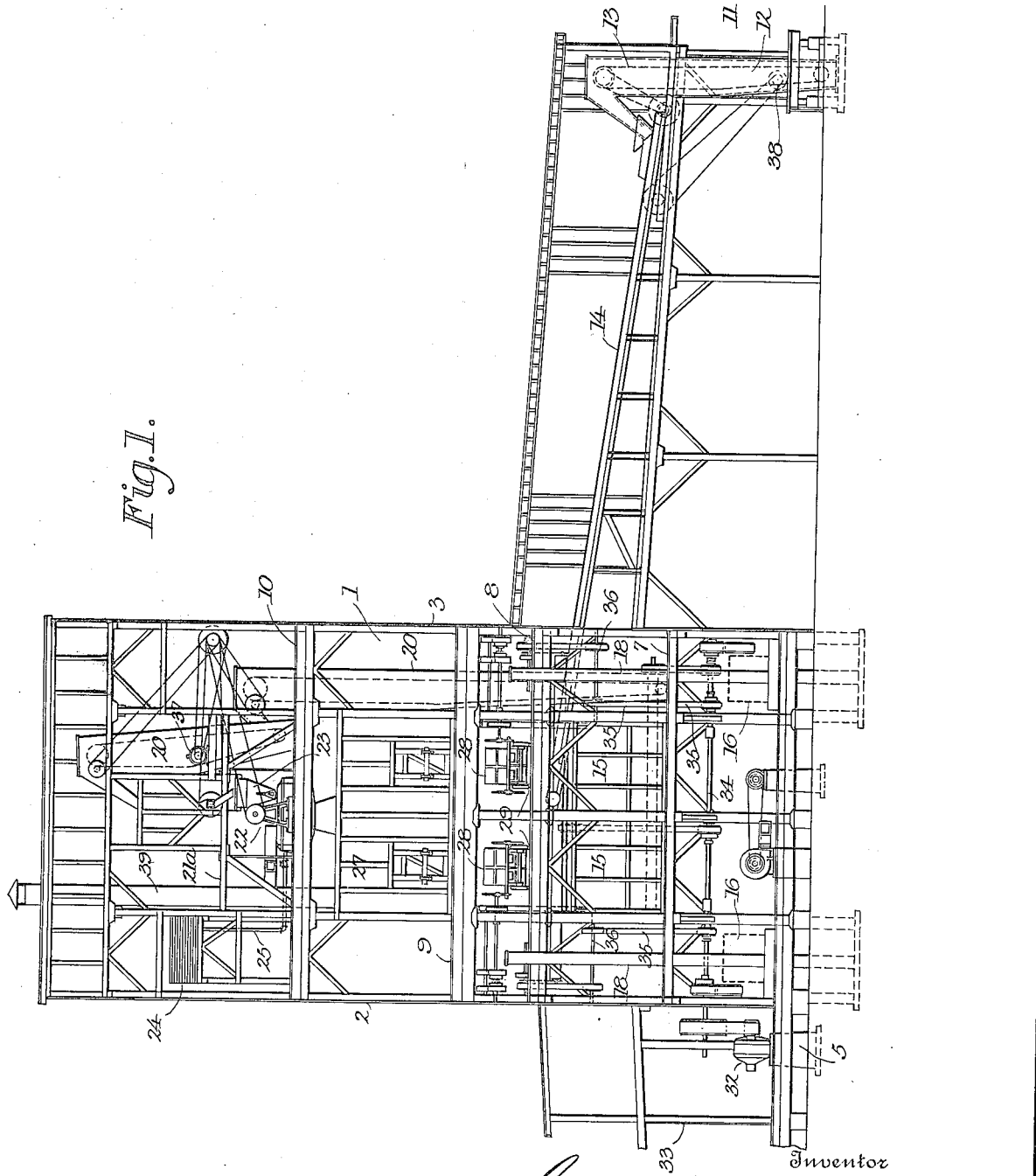

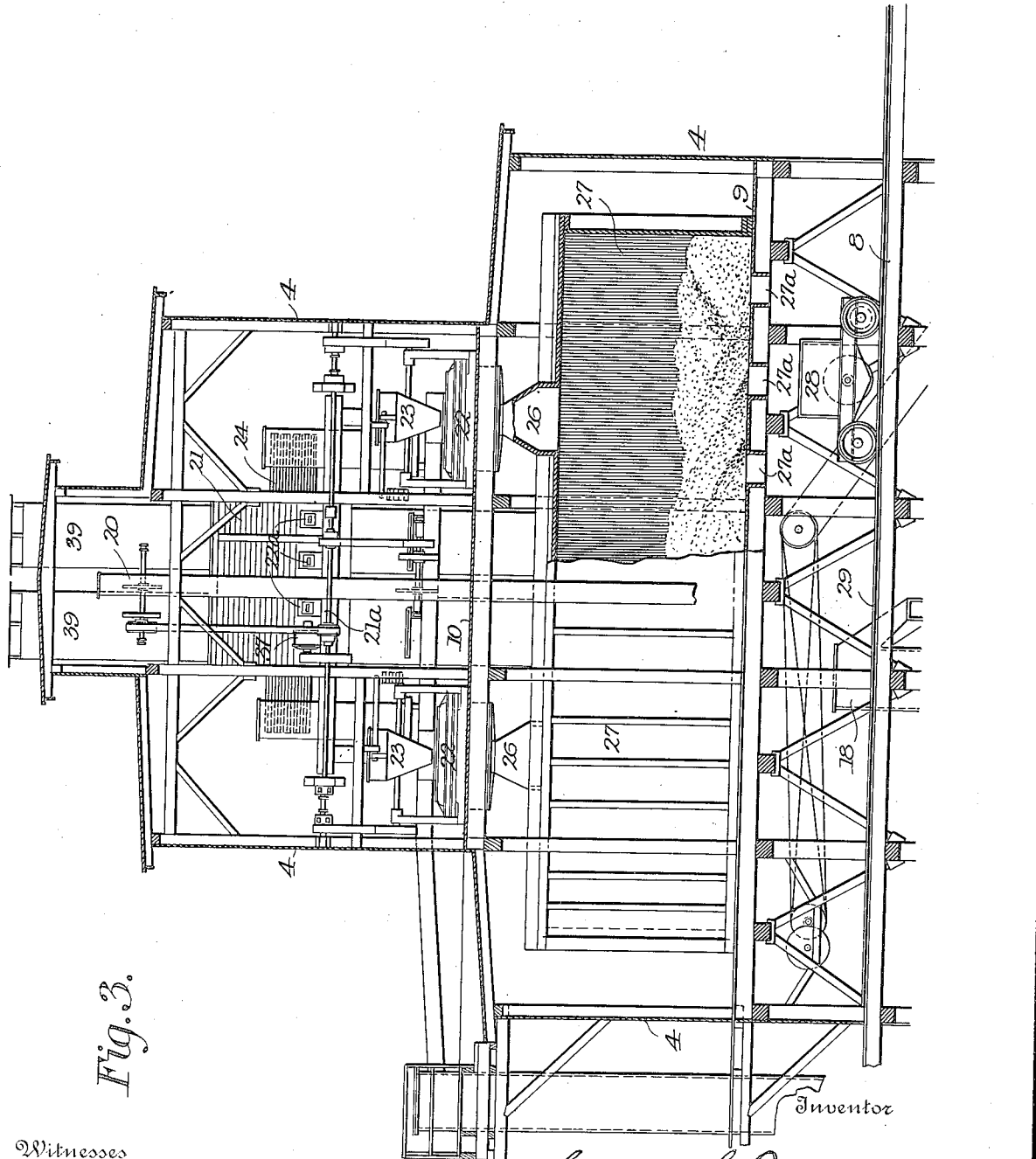

G. L. PRATT.
MANUFACTURING AND CURING ACID PHOSPHATES AND THE LIKE.
APPLICATION FILED JAN. 30, 1912.
1,137,531.
Patented Apr. 27, 1915.
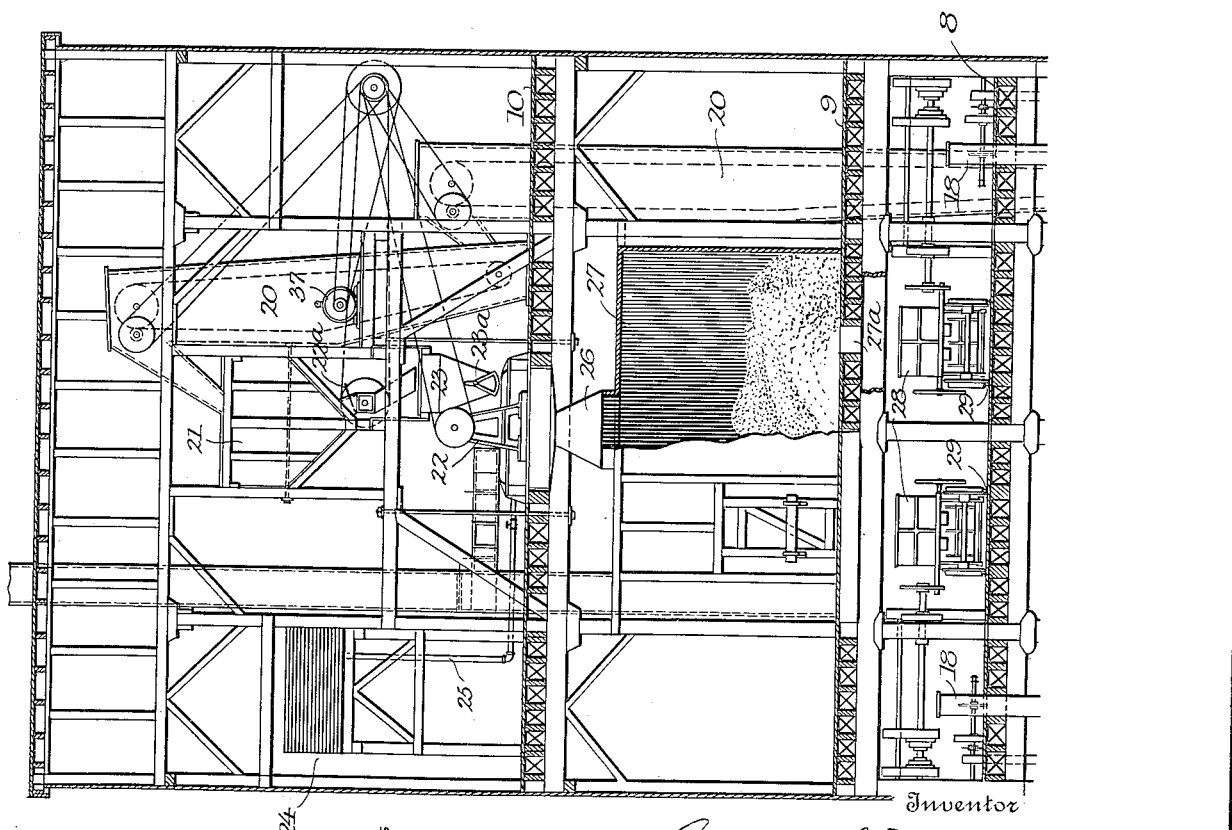

UNITED STATES PATENT OFFICE.

GEORGE L. PRATT, OF ATLANTA, GEORGIA.

MANUFACTURING AND CURING ACID PHOSPHATES AND THE LIKE.

1,137,531. Specification of Letters Patent. Patented Apr. 27, 1915.

Application filed January 30, 1912. Serial No. 674,392.

*To all whom it may concern:*

Be it known that I, GEORGE L. PRATT, a citizen of the United States, residing at Atlanta, in the county of Fulton and State of Georgia, have invented certain new and useful Improvements in Manufacturing and Curing Acid Phosphates and the like, of which the following is a specification, reference being had therein to the accompanying drawing.

This invention relates to manufacturing and curing acid phosphates and the like.

At the present time, one method (and the usual one) of manufacturing acid-phosphate—a mixture of ground phosphate rock and sulfuric acid—is to bring these two ingredients together in proper proportion in a mechanically-operated mixing tub, in which rotate appropriately shaped stirrers. When the mechanical action has proceeded to a predetermined stage, and the chemical action has resulted in a condition of the material which renders further mechanical action difficult, the contents of the mixing tub are discharged or delivered into one of a pair of rooms or so-called "dens" which are located beneath the mixer or mixing tub. The mixture is allowed, then, to accumulate and remain in said room or "den" for a certain period, as for instance, for a day or a portion thereof. While in this "den", an initial curing of the mass is effected. Thereafter, as for instance, the succeeding day, the contents of the mixer are discharged into the other room or "den" of the pair so that the chemical action may continue in said "den" undisturbed and, also, in order that removal of the previous day's mixing from the first-mentioned "den" may be accomplished. The discharging, therefore, of the mixture is alternately into one or the other of these "dens".

The resultant, initially-cured mass is dry and friable; but it is a characteristic of this material that it will, if subjected to a rubbing pressure, be readily converted into a gummy, sticky mass, and it is then most difficult to manipulate. While it thus appears desirable that all subsequent handling of the mass should be effected in a manner to avoid its being subjected to such rubbing pressure; yet, under present-day methods, such handling is attended with considerable manipulation and consequent rubbing, since removal of the mixture from a "den" is usually accomplished by providing a large hopper beneath the "dens", and into this the material is trucked or shoveled so that it may discharge its contents into the boot of a juxtaposed elevator which, in turn, carries the acid-phosphate out of or toward the top of the building. There it is discharged into a car or cars running on an elevated track located over the permanent storage. Another way is to discharge the material onto a conveyer and, thence, into the aforementioned elevator. The car, having received the material from the elevator, delivers it at the required point into a permanent storage shed. In carrying this method into effect, serious difficulties have been encountered whereby the handling of the acid-phosphate is rendered expensive and troublesome. These are due to the following conditions and circumstances: In the first place, it may be mentioned that the acid-phosphate mixture, in its fresh condition after being mixed the preceding day in the mixing tower, as already explained, contains a considerable amount of free sulfuric acid, and its condition is such that it is particularly difficult to handle, if, as already mentioned, it should by being subjected to any rubbing pressure become sticky and gummy; that is to say, its condition will then render it exceedingly inconvenient and troublesome to shovel it; moreover, it will not then slide readily down the sides of the hopper disposed beneath the "den"; and, furthermore, it cannot easily be handled by the ordinary link-belt chain elevator and bucket. By reason of the fact that the material, under present-day practice, becomes sticky and gummy, as aforementioned, the parts of the apparatus with which it comes into contact must be frequently—in fact, constantly—cleaned, and serious wear and tear thereon is necessarily the result. The expense of effecting this cleaning is great and, moreover, the operation of the apparatus (or at least parts of it) must be discontinued temporarily to permit this to be accomplished, and at which times, also, worn parts must be replaced. In a word, it may be stated that the use of such apparatus is attended with objectionable features and difficulties and entails great expense. And yet, so far as I am aware, no other method has heretofore been proposed by which this material, or others of a similar character, can be handled without an undesirable amount of rubbing after it is removed from the curing den.

The object of my invention is, therefore, to provide an entirely new method and modus of procedure whereby these difficulties are overcome and said objectionable features eliminated.

Still another object is to simplify the entire system of handling acid-phosphate, or other materials of a like nature, whereby the product produced is of a better grade, of a more uniform character, and of an increased value per ton of raw material, and whereby, also, the structures forming parts of the system are materially reduced in number.

In practising my method, it is possible to handle the mass, from the time it is removed from the curing den to the time that it is delivered at the point of storage, with an avoidance of rubbing pressure since this, as already mentioned, has the effect of rendering the mass sticky and gummy and difficult to manipulate. This is accomplished by resorting to a radical departure from present-day methods.

With these and other objects in view, the invention resides in the method as hereinafter fully described and claimed.

In the accompanying drawings, I have illustrated a preferred form of apparatus for carrying my novel method of handling acid-phosphate into effect. It will of course be understood that I do not restrict myself to this precise structure nor to the details thereof, inasmuch as any other may be utilized so long as it is characterized by the underlying principle involved in my invention, as hereinafter stated.

Figure 2:
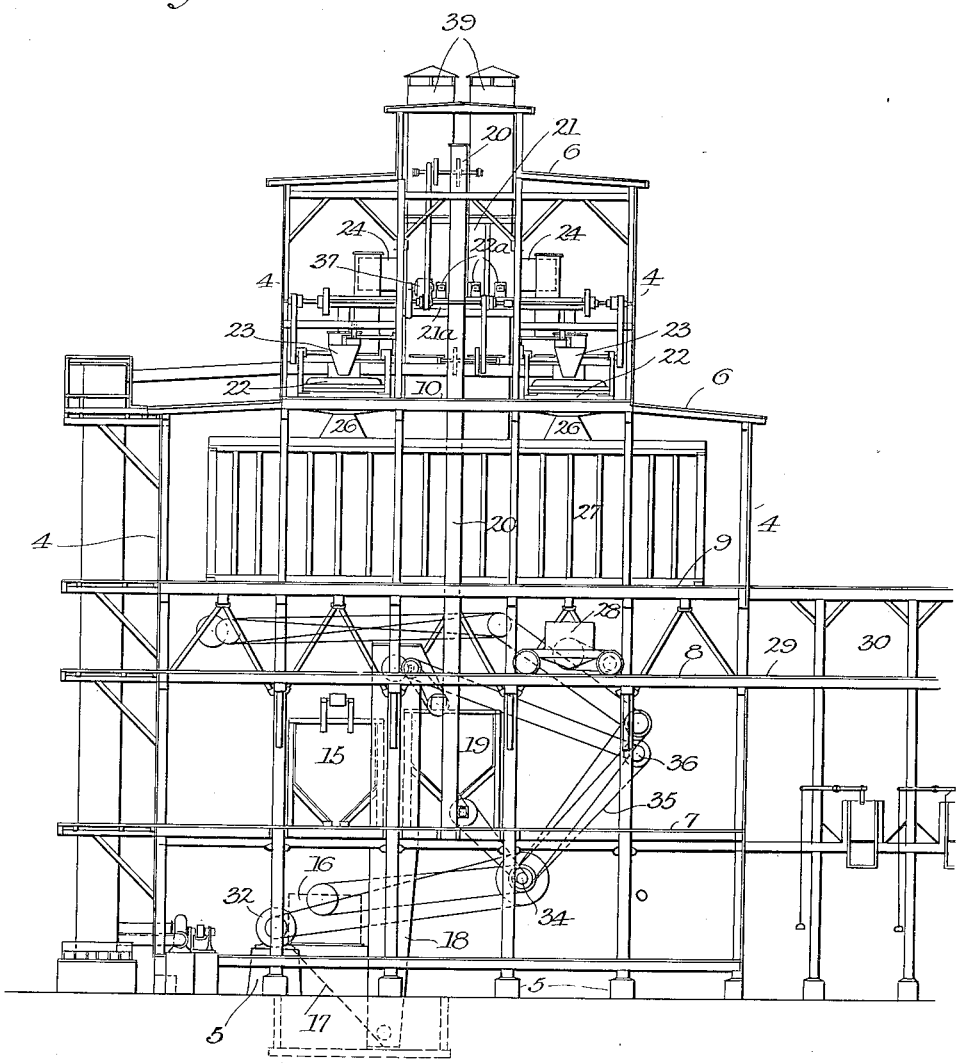

In these drawings: Figure 1 is an elevational view of the structure embodying apparatus for carrying my invention into effect, the end wall of the housing being removed to disclose the interior mechanisms, etc.; Fig. 2 is a similar view of the structure with the front wall omitted, the same being taken at right angles to Fig. 1; Fig. 3 is a view in vertical section showing, on a larger scale, the parts appearing in Fig. 2, and with the lower portion of the housing omitted; Fig. 4 is a transverse vertical section showing, on a larger scale, the parts appearing in Fig. 1, and with the lower part of the structure omitted; and Figs. 5 and 6 are diagrammatic views, respectively, illustrating the usual arrangement of apparatus heretofore employed and, also, my improved apparatus.

Referring to the drawings, the numeral 1 designates, in general, the housing constituting a plant suitable for the manufacture of acid-phosphate, and comprising front, rear and side-walls, 2, 3, and 4, respectively; a foundation 5; a roof 6, and a plurality of floors 7, 8, 9 and 10.

It is proper to explain here that it is a desideratum of my invention to progress the mass, after it has been developed into a certain condition, with an avoidance of such manipulation as would render it sticky and gummy; and, to this end, to effect the necessary discharging of the mixture (after the phosphate and acid have been brought together) from a relatively high point or plane in the apparatus, progressively downward and always successively and directly into some receptacle or structure underlying that from which the discharge is effected. In this way, the mixture is continually traveling downward and never upward. I thereby avoid the use of hoppers, conveyers, etc., such as are employed in methods now in practice. By the elimination of such hoppers, conveyers, etc., I greatly reduce the number of structures into which the mixture must be delivered, with the important and desirable result that the number of times which the mass must be handled is materially reduced, the whole process is greatly shortened and simplified, and the manipulation of the mass is reduced to a minimum. By the utilization of this novel method, there are fewer structures upon which wear and tear occur. Thereby, the expense of maintenance, repairs, etc., is consequently reduced.

Preliminary to mixing the phosphate and acids at an altitudinal point, as contemplated by my novel procedure, the phosphate rock is stored in bins in a storage shed 11 located adjacent to and communicating with the housing 1. In any convenient manner, the rock is delivered to an elevator 12 at the end of shed 11, in which a suitable conveyer 13 is adapted to be housed. This conveyer carries the rock upward so that it may be deposited upon a constantly and rapidly-traveling inclined conveyer 14, and from which the rock is discharged, within the housing 1, into suitable bins or other form of receptacle 15, 15, supported on the second floor 7 of the housing. Through the bottom of these bins, the phosphate rock is discharged into one or more of a series of underlying pulverizers 16. The pulverized material or dust passes from the pulverizers into adjacent chutes 17, and from which, by means of an elevator or other form of carrier 18, it is raised into a lower dust-storage bin 19. Thence, when needed, this dust is, by an elevator 20, carried to an upper dust bin 21, sustained by a super-structure 21ᵃ, from which it is supplied, in predetermined quantities, into a mixer 22, supported on the flooring 10. The quantity of the dust is supplied in regulable quantities by reason of the fact that, intermediate of the upper bin and the mixer, a suitable weighing hopper 23 is arranged, and through this the dust passes. Its discharge from the bin into the hopper is controlled by a slide gate 22$^a$, and the movement of the dust from the hopper into the mixer is controlled by a pivoted gate 23$^a$.

In lieu of the method just described of delivering the phosphate rock to the pulverizers and the dust therefrom through the aforementioned storage bin to the upper storage bin and thence to the mixing tub, I may employ any other appropriate method of securing pulverized rock and delivering it to the proper altitude.

Supported on but above the floor 10 is an acid tank 24, which constitutes the source of supply of acid or the like, from which the acid, suitably controlled, is conveyed, by means of a suitable piping, 25, into the mixer 22, where it and the phosphate dust are mixed until they are of the proper consistency. When in this fresh condition, the mass is particularly difficult and troublesome to handle, because, as already mentioned, it is sticky or gummy, by reason of the fact that it contains a considerable amount of free sulfuric acid. It is, therefore, essential to effect the mixing at an altitudinal point or plane relatively to its final discharge into a permanent storage; and then arrange to have its travel, toward this permanent storing place, always downwardly. In other words, throughout all subsequent operations, after the mixing, it is preferable and important to permit the mass to be discharged successively from one structure to another in a downward direction, and thereby avoid the use of hoppers, elevators, etc., to raise it into carriers which, of necessity, travel in a plane considerably above that of the usual hoppers now in use in these plants. It will therefore be understood as of the essence of my invention that the various structures presently to be described are to be arranged so that they will discharge their contents successively and directly into the next underlying structure, whereby the use of conveyers, elevators, or other raising devices for carrying the mass upward may be entirely avoided and whereby handling of the mass is reduced to a minimum.

The mass, having been mixed to the proper consistency, as aforementioned, is discharged from the mixer, through a suitable chute 26, into an underlying curing bin or holder 27, usually called a "den," supported on the floor 9. This mass is then permitted to remain in these so-called "dens" for a period sufficient to effect an initial curing thereof, resulting in the mass becoming dry and friable, whereupon it is shoveled or otherwise removed therefrom, as through openings, slots or holes 27$^a$ in the floor of the den and directly over cars or other forms of carriers 28 adapted to traverse tracks or rails 29 supported on the floor 8.

It will be understood that any desired number of mixers, "dens," and carriers may be provided to handle the product. In this instance, I have shown two sets or series of these.

As soon as the car is filled, it is moved along the tracks in any way desired, and to a dump-shed 30, constituting a storage place for the mass dumped from the cars.

From the foregoing, it will be recognized that the various structures referred to, beginning, for instance, with the mixing-tub and more especially the curing den, occupy, progressively, a relatively lower plane, from which it follows that the initially cured, dry and friable mass progressively travels or passes from a relatively high plane to a lower one, and that its movement from the curing den to the car is always downward and never upward; furthermore, that the discharge of the mass from one structure is directly into another, so that no conveyers or the like are required to aid in the handling of the material after it has been rendered into an initially-cured condition. In consequence, the likelihood of this initially-cured mass being subjected to rubbing pressure is avoided so that, when it reaches the storage place, it still is in the aforementioned dry and friable condition. Its final curing is then accomplished at the storage place.

To operate the various mechanisms, etc., I may employ any suitable power derived from a suitable source. For convenience and economy, I may elect to actuate a plurality of these from a common drive or power-device. To this end, I arrange a motor 32 on the foundation 5 preferably in a housing 33 adjacent to the main housing 1. By means of pulleys and belt, a main shaft 34 is rotated. Operatively connecting with this shaft, by belts 35 or the like, are shafts 36, and the various conveyers, elevators, etc., utilized to raise the phosphate rock and dust, are driven thereby.

By reason of the fact that the mixer is rather remote from the motor 32, I prefer to drive it by a separate motor 37. Similarly, a separate drive 38 for the rock-carrying elevator 12 and conveyer 13 is provided. Extending upwardly from the "dens," so-called, and above the roof of the housing, are flues 39, as usual.

While I have hereinbefore described my invention in detail, and particular forms of structure, it is to be understood that I do not limit myself to such details, nor to the particular forms disclosed, except in so far as these are specified in the claims.

Having thus described my invention, the method embraced thereby, and an exemplification of preferred and suitable apparatus for carrying such method into effect, what I claim and desire to secure by Letters-Patent is:

1. The method of manufacturing acid phosphate, which consists in introducing into a curing den a substantially viscous mass of phosphatic dust and acid, effecting an initial curing of the mass therein, removing it from the den, and delivering the initially-cured mass to a place of storage for final curing, all operations subsequent to the introduction of the mass into the den being performed without rubbing, paste-producing pressure thereon.

2. The method of manufacturing acid phosphate in connection with curing-den systems, which consists in introducing phosphatic dust to a mixer, commingling acid therewith to convert it into a viscous mass, then discharging the viscous mass into an underlying curing den to effect its initial curing therein, removing the resultant initially-cured, dry and friable mass from the den, and delivering it to a place of storage; the operations subsequent to the introduction of the mass into the curing den being effected entirely from a relatively high to a lower plane, whereby subsequent elevation of and consequent rubbing pressure on the mass are avoided.

3. The method of manufacturing acid phosphate in connection with curing den systems, which consists in mixing phosphatic dust and acid into a viscous mass at a relatively high plane, then discharging the viscous mass into an underlying curing den, subjecting said mass in the den to an initial curing action, then removing the resultant initially-cured, dry and friable mass from the den, and, finally, discharging the friable mass into a second underlying transporting instrumentality without subjecting the same to rubbing pressure; the discharging of the initially-cured mass from one point to another being effected entirely from a relatively high to a lower plane, whereby subsequent elevation of and consequent rubbing pressure on the mass are avoided.

4. The method of manufacturing acid phosphate in connection with curing den systems, which consists in introducing a previously-pulverized phosphatic mass to a mixer at a relatively high plane, commingling acid therewith to convert it into a viscous mass, discharging the mass into an underlying curing den for effecting an initial curing of the mass therein, and finally, discharging the initially-cured mass into an underlying carrier; the operations of discharging the initially-cured mass being effected entirely from a relatively high to a lower plane and with avoidance of rubbing pressure that would convert the mass into a sticky and gummy condition.

5. The method of handling a mass of material in connection with curing den systems, which consists in introducing into a mixer disposed at a relatively high plane a previously-pulverized solid ingredient in conjunction with the introduction thereinto of an acid to convert it into a viscous mass, then discharging the viscous mass into an underlying curing holder, retaining said mass in the holder to effect an initial curing thereof, then discharging the resultant initially-cured, dry and friable mass directly into an underlying carrier and therein transporting it on a substantially horizontal plane, and, finally, discharging the contents of the carrier to an underlying storage place for final curing; the several discharging operations of the initially-cured mass being progressively effected from a relatively high to a lower plane whereby elevation thereof and consequent rubbing pressure thereon are avoided.

6. The method of manufacturing acid phosphate in connection with curing den systems, which consists in mixing a phosphatic material with an acid at a relatively high plane to convert it into an acid-impregnated mass, then discharging the same as a viscous mass into an underlying curing den to effect an initial curing therein, then discharging the resultant initially-cured, dry and friable contents of the den into an underlying carrier and thereby transporting it on a substantially horizontal plane to an underlying storage bin; the several discharging operations being progressively effected successively and directly from a higher to a lower plane and with avoidance of rubbing pressure thereon such that would convert it into a sticky and gummy mass; the progress of the acid-impregnated mixture being interrupted temporarily after its discharge into the curing den to effect the aforementioned initial curing thereof and its conversion into a dry and friable mass.

7. The method of manufacturing acid phosphate which consists in elevating phosphatic dust and acid to a relatively high point to enable all subsequent steps to be performed without reëlevation of the mass, mixing the dust and acid, then discharging the resultant viscous mass into a den to effect an initial curing thereof, then discharging the resultant initially-cured, dry and friable mass from said den into a car for its transportation on an approximately horizontal plane, and, finally, discharging the dry and friable mass to an underlying storage place for final curing; the several discharging operations being effected from a relatively high to a lower plane whereby rubbing pressure thereon is avoided.

8. The method of manufacturing acid phosphate which consists in mixing phosphatic dust and acid, delivering the resultant viscous mixture into a den wherein its initial curing is effected, removing the resultant initially-cured, dry, friable, solid acid phosphate therefrom and discharging it by gravity into an underlying carrier, and transporting said initially-cured acid phosphate from beneath the den, without reelevation of the mass, to a point from which it is dumped by gravity into an underlying storage place for final curing.

In testimony whereof I affix my signature in presence of two witnesses.

GEORGE L. PRATT.

Witnesses:
A. M. PARKINS,
EDMUND H. PARRY.